(12) United States Patent
Bai

(10) Patent No.: US 10,380,464 B2
(45) Date of Patent: Aug. 13, 2019

(54) FAST RASTER IMAGE PROCESS BY DETECTING CONSTANT COLOR LINES IN PERPENDICULAR DIRECTION

(71) Applicant: Kyocera Document Solutions Inc., Osaka (JP)

(72) Inventor: Xuqiang Bai, Rancho Palos Verdes, CA (US)

(73) Assignee: Kyocera Document Solutions Inc., Osaka (JP)

( * ) Notice: Subject to any disclaimer, the term of this patent is extended or adjusted under 35 U.S.C. 154(b) by 41 days.

(21) Appl. No.: 15/859,532

(22) Filed: Dec. 31, 2017

(65) Prior Publication Data

US 2019/0205711 A1 Jul. 4, 2019

(51) Int. Cl.
*G06F 3/12* (2006.01)
*H04N 1/00* (2006.01)
*G06K 15/02* (2006.01)

(52) U.S. Cl.
CPC ....... *G06K 15/1836* (2013.01); *G06F 3/1203* (2013.01); *G06F 3/1248* (2013.01); *G06F 3/1286* (2013.01); *H04N 1/00411* (2013.01); *H04N 2201/0082* (2013.01)

(58) Field of Classification Search
CPC . G06K 15/1836; G06F 3/1248; G06F 3/1203; G06F 3/1286; H04N 1/00411; H04N 2201/0082
See application file for complete search history.

(56) References Cited

U.S. PATENT DOCUMENTS 9,436,897 B2 9/2016 Minakata

FOREIGN PATENT DOCUMENTS

JP 2001-111820 A 4/2001
JP 2008-078826 A 4/2008

*Primary Examiner* — Christopher Wait
(74) *Attorney, Agent, or Firm* — HEA Law PLLC

(57) ABSTRACT

An image processing method includes: obtaining first raster line data as data of a first raster line including a plurality of pixels arranged in a first direction from raster data; generating raster line segment data as data of a raster line segment including a plurality of pixels arranged in a second direction perpendicular to the first direction from the received N number of the first raster lines; determining whether the plurality of pixels have an identical pixel value, the plurality of pixels constituting the raster line segment; encoding the raster line segment where the plurality of pixels have the identical pixel value; storing second raster line data as data of the second raster line including a plurality of pixels arranged in the second direction, which is produced by connecting the plurality of raster line segments; and rendering the second raster lines while decoding the encoded raster line segment.

18 Claims, 10 Drawing Sheets

Original page

Raster data

Page orientation

FAST RASTER IMAGE PROCESS BY DETECTING CONSTANT COLOR LINES IN PERPENDICULAR DIRECTION

BACKGROUND

Unless otherwise indicated herein, the description in this section is not prior art to the claims in this application and is not admitted to be prior art by inclusion in this section.

This disclosure relates to an image-forming apparatus having a printing function, such as printers, copiers, facsimile machines, and multi-function peripheral (MFP) having the functions of these apparatuses. The image-forming apparatus processes images with high resolution, which includes time consuming data format conversions and color conversion process as a raster image process. Meanwhile, the image-forming apparatus receives a print job described in page description language (PDL), which includes raster data and page orientation data. In some cases, the page orientation specified by the page orientation data is 90 or 270 degrees different from its raster orientation.

SUMMARY

An image processing method according to one aspect of the disclosure includes: obtaining first raster line data as data of a first raster line including a plurality of pixels arranged in a first direction from raster data; generating raster line segment data as data of a raster line segment including a plurality of pixels arranged in a second direction perpendicular to the first direction from the received N (N is an integer of two or more) number of the first raster lines; determining whether the plurality of pixels have an identical pixel value, the plurality of pixels constituting the raster line segment; encoding the raster line segment where the plurality of pixels have the identical pixel value; storing second raster line data as data of the second raster line including a plurality of pixels arranged in the second direction, the second raster line being produced by connecting the plurality of raster line segments; and rendering the second raster lines while decoding the encoded raster line segment.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
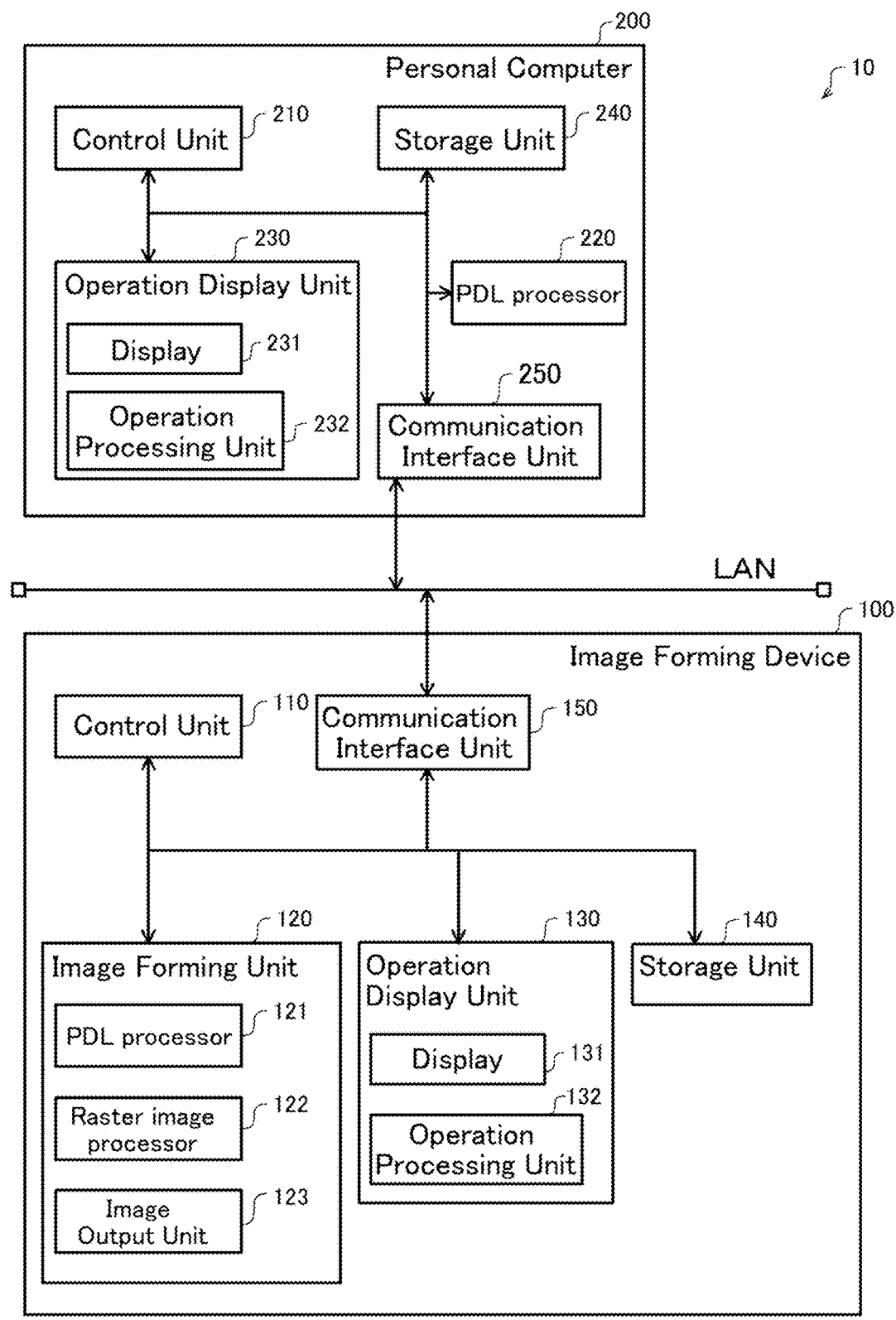
FIG. 1 illustrates a block diagram representing a functional configuration of an image forming system 10 according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes embodiments of the disclosure (hereinafter referred to as, the "embodiment") with reference to the drawings.

FIG. 1 illustrates a block diagram representing a functional configuration of an image forming system 10 according to one embodiment of the disclosure. The image forming system 10 includes an image forming device 100 and a personal computer 200. The personal computer 200 is connected to the image forming device 100 via a network (which is a local area network (LAN) in this example).

The image forming device 100 includes a control unit 110, an image forming unit 120, an operation display unit 130, a storage unit 140, and a communication interface unit 150. The personal computer 200 includes a control unit 210, a PDL processor 220, an operation display unit 230, a storage unit 240, and a communication interface unit 250. The PDL processor 220 processes image data to generate a print job described in a page description language (PDL).

The communication interface unit 150 and the communication interface unit 250 communicate using a transmission control protocol/Internet protocol (TCP/IP) suite. The communication interface unit 150 functions as a print data receiver in this embodiment. The print data receiver may receive print data via a discrete I/O interface.

The image forming unit 120 includes a PDL processor 121, a raster image processor 122, and an image output unit 123. The PDL processor 121 analyzes the PDL data sent from the personal computer 200 to extract encoded raster data, page orientation data, and similar data from the PDL data. The PDL processor 121 decodes the encoded raster data and then transfers the decoded raster data to the raster image processor 122.

The raster image processor 122 converts a format of the decoded raster data based on the page orientation data, which indicates a page orientation with which the raster data is aligned. The raster image processor 122 renders the decoded image data to generate bit map data of the image. The raster image processor 122 performs the color conversion process on the bit map data to generate print data. The image output unit 123 prints an image on a printing medium based on the generated print data.

The operation display unit 130 of the image forming device 100 includes a display 131 and an operation processing unit 132. The operation display unit 230 of the personal computer 200 includes a display 231 and an operation processing unit 232. The display 131, which functions as a touch panel, displays various menus as a receiving screen. The operation processing units 132 and 232 accept an input operation of a user from the displays 131 and 231, which function as a touch panel, and various kinds of buttons and switches (not illustrated).

The control units 110 and 210 include a main storage unit, such as a RAM and a ROM, and a control unit, such as a micro-processing unit (MPU) and a central processing unit (CPU). The control units 110 and 210 also include a controller function related to an interface, such as various kinds of I/Os, a universal serial bus (USB), a bus, and other hardware, and control the entire image forming device 100 and the entire personal computer 200, respectively.

The storage units 140 and 240 are storage devices formed of such as a hard disk drive and a flash memory, which are non-transitory recording mediums, and store control programs and data of processes performed by the control units 110 and 210, respectively.

Comparative Example

Figure 2:
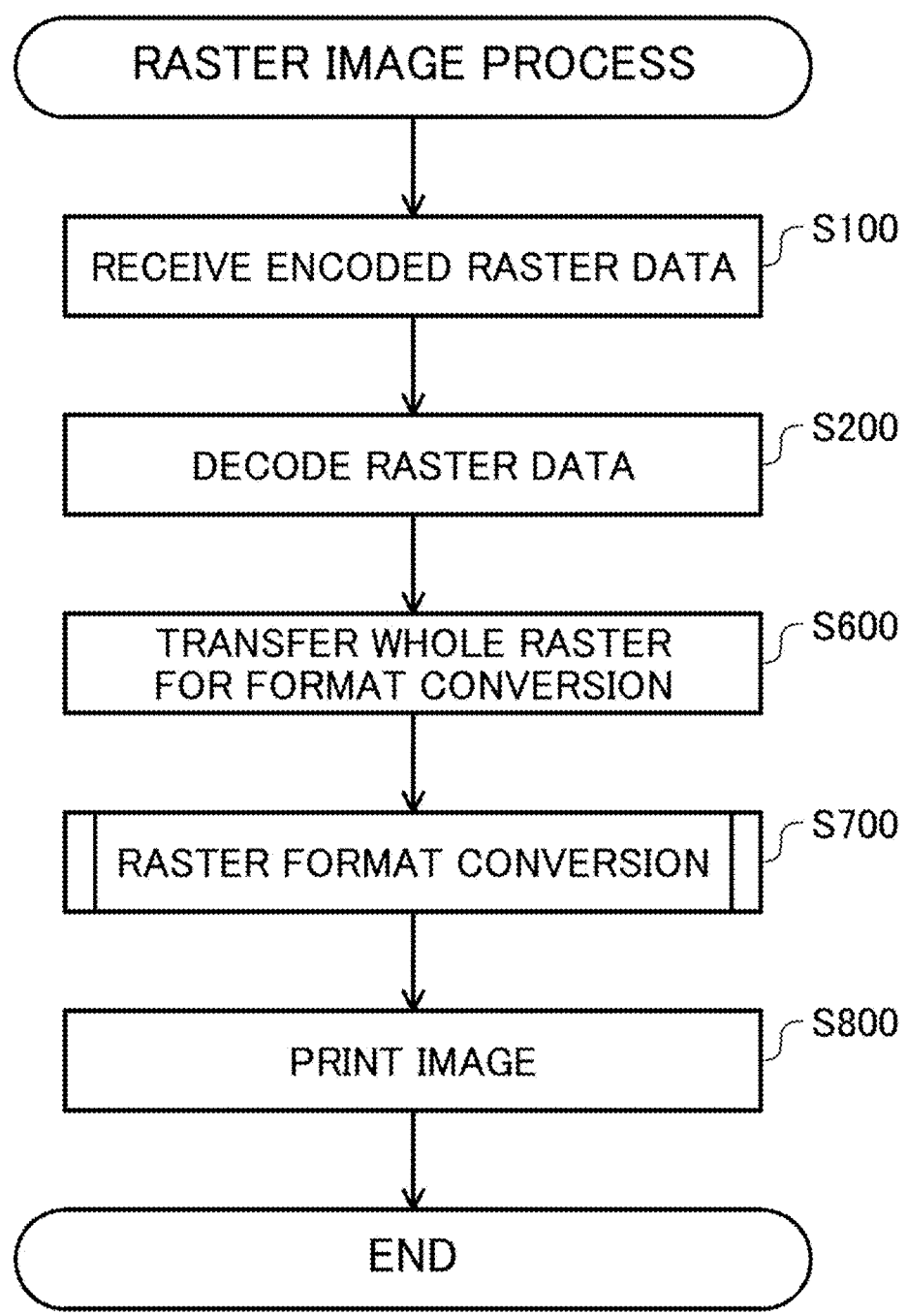
FIG. 2 illustrates a flow chart representing a raster image process according to a comparative example.
Figure 3:
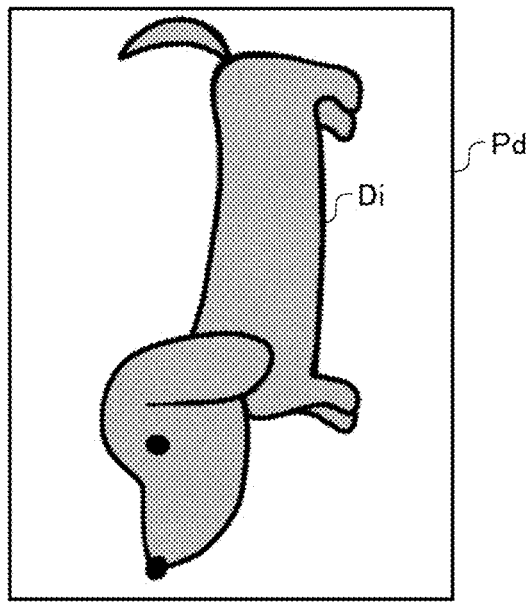
FIG. 3 illustrates page data for reproducing an original page image described in PDL.
Figure 3:
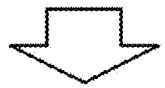
Figure 3:
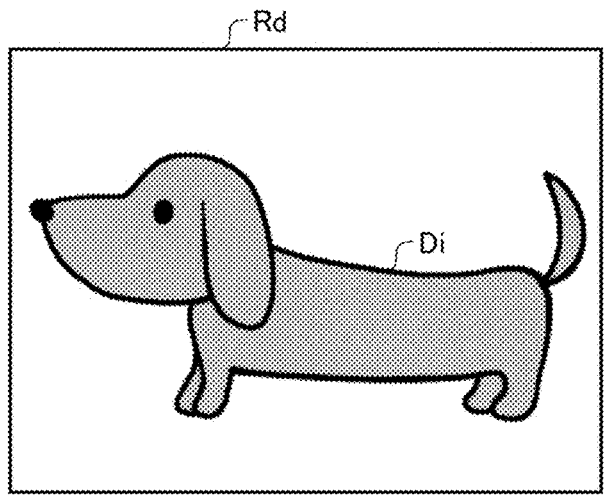
Figure 3:
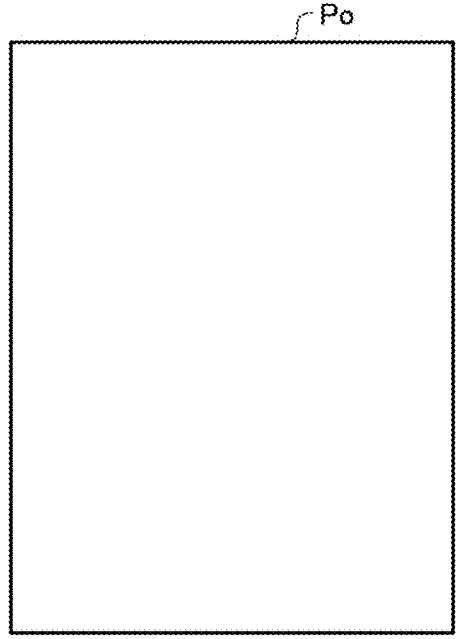

FIG. 2 illustrates a flow chart representing a raster image process according to a comparative example. FIG. 3 illustrates page data for reproducing an original page image Pd described in PDL. The PDL data is generated by the PDL processor 220 in the personal computer 200 from original page data, which represents the original page image Pd specified by, such as a draw application program. The original page data includes raster data Rd, which is composed of rows of pixel color values to represent an image, and page orientation data, which specifies "portrait" or "landscape" page orientation.

In this case, the PDL data includes the raster data Rd, which represents an image of dog Di, and the page orientation data, which specifies portrait Po as illustrated in FIG. 3. According to the page orientation data, the page orientation, or portrait Po, is 270 degrees different from the raster orientation as illustrated in FIG. 3. For such a case, the raster is treated vertically or perpendicularly to align the raster orientation with the page orientation.

At Step S100, the image forming device 100 receives PDL data, which includes the encoded raster data Rd, from the personal computer 200 using the communication interface unit 250 via the communication interface unit 150. The PDL processor 121 analyzes the PDL data to extract the encoded raster data Rd from the PDL data.

At Step S200, the PDL processor 121 decodes the encoded raster data to generate decoded raster data, which is also simply referred to as "raster data Rd." At Step S600, the PDL processor 121 transfers the raster data Rd row by row to the raster image processor 122.

Figure 4:
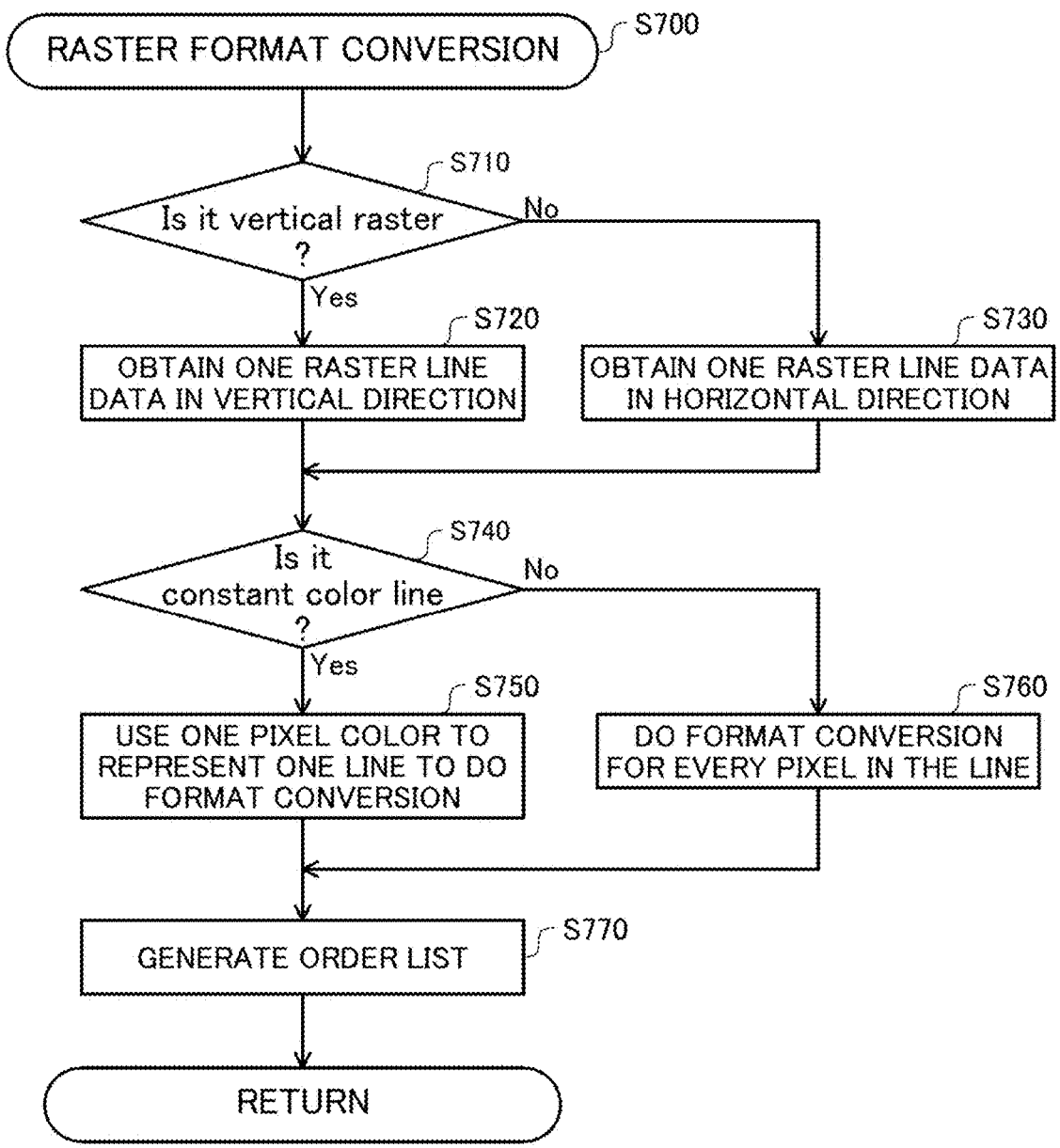
FIG. 4 illustrates a flow chart representing a raster format conversion process according to the comparative example.

FIG. 4 illustrates a flow chart representing a raster format conversion process (S700) according to the comparative example. The raster format conversion process includes an aligning process, a color conversion process, and a scaling process. The aligning process aligns the raster data RD with the page orientation Po based on the page orientation data at the processes of Steps S710 to S730.

At Step S710, the raster image processor 122 determines whether the raster data includes vertical or perpendicular raster lines or not based on the page orientation data. If the raster data is determined to include the vertical raster lines, the raster image processor 122 advances the process to Step S720. If the raster data is determined not to include the vertical raster lines, the raster image processor 122 advances the process to Step S730.

At Step S720, the raster image processor 122 obtains one raster line in the vertical direction, which is one column pixels of the raster data Rd. At Step S730, the raster image processor 122 obtains one raster line in a horizontal or parallel direction, which is one row pixels of the raster data Rd.

The horizontal direction is also referred to as "first direction." The vertical direction is also referred to as "second direction." The first direction is perpendicular to the second direction. The horizontal raster line is also referred to as "first raster line." The vertical raster line is also referred to as "second raster line." The first raster line is perpendicular to the second raster line. The first raster line includes a plurality of pixels arranged in the first direction. The second raster line includes a plurality of pixels arranged in the second direction. Thus, the aligning process aligns the raster data RD with the page orientation Po at the processes of Steps S710 to S730 by using the second raster line (column) perpendicular to the first raster line (row) as the first raster line.

At Step S740, the raster image processor 122 determines whether the one raster line represents a constant color line or not. The constant color line consists of a plurality of pixels having an identical pixel value. If the one raster line is determined to represent the constant color line, the raster image processor 122 advances the process to Step S750. If the one raster line is determined not to represent the constant color line, the raster image processor 122 advances the process to Step S760.

At Step S750, the raster image processor 122 uses a single pixel color to represent the one raster line when performing the format conversion process and the color conversion process to generate bitmap data for reproducing the one raster line of the original page. This eliminates the need for the format conversion and the color conversion process for every pixel, which are time consuming processes.

At step S760, the raster image processor 122 performs the format conversion and the color conversion process for every pixel in the one raster line to generate bitmap data for reproducing the one raster line of the original page. At Step S770, the raster image processor 122 prepares an order list to reproduce the original page using the generated bitmap data. The raster format conversion process (S700) is performed on all the horizontal/vertical raster lines.

At step S800 (see FIG. 2), the image output unit 123 prints or reproduces the original page image Pd (see FIG. 3) on a printing medium based on the generated print data and the order list. The image output unit 123 outputs the printed medium.

Embodiment

Figure 5:
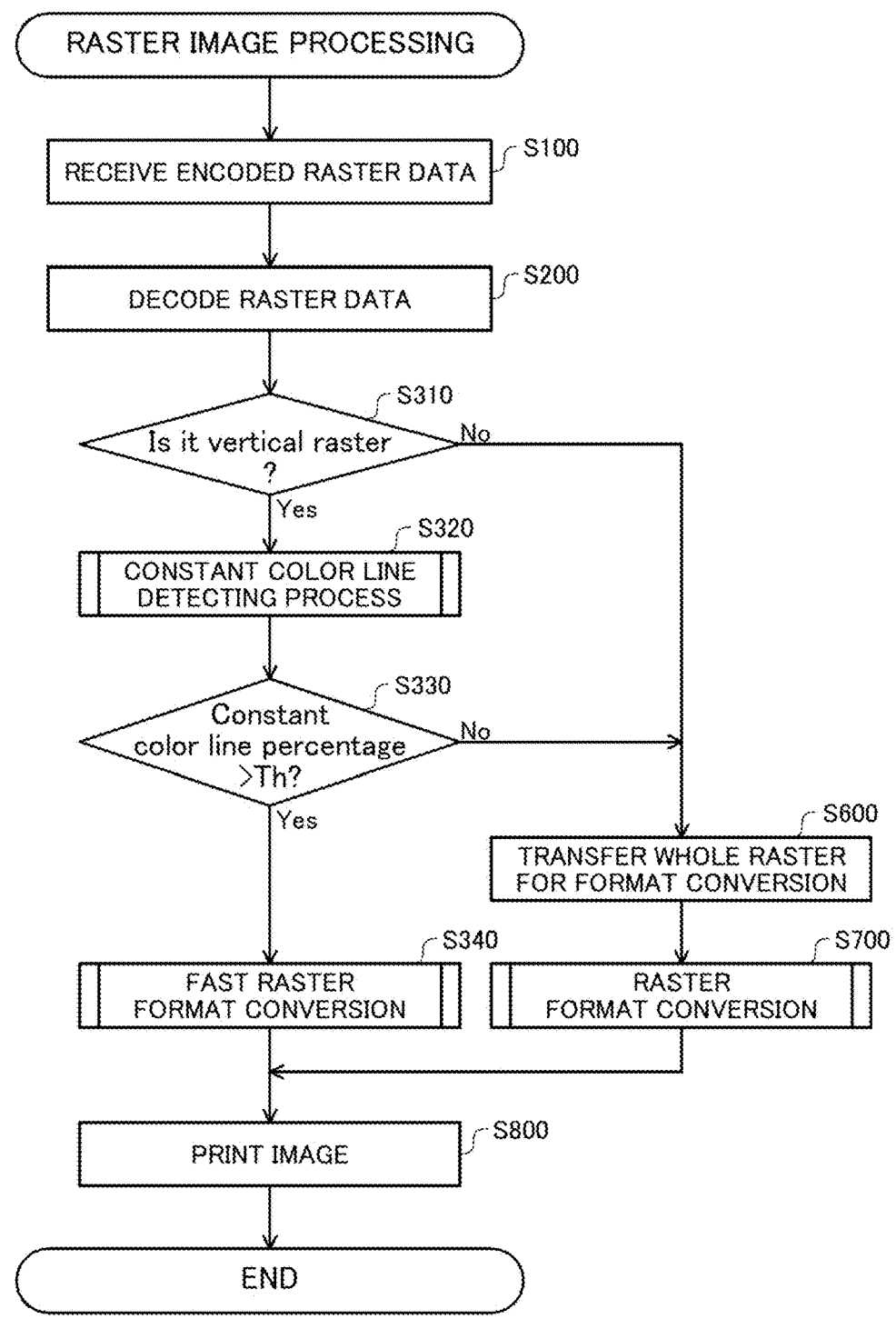
FIG. 5 illustrates a flow chart representing a raster image process according to one embodiment.

FIG. 5 illustrates a flow chart representing a raster image process according to the one embodiment. The processes at Steps S100 and S200 according to the one embodiment are identical to those of the comparative example. At Step S310, the raster image processor 122 determines whether the raster data Rd includes vertical raster lines or not based on the page orientation data similarly to Step S710.

If the raster data Rd is determined not to include the vertical raster lines, the raster image processor 122 advances the process to Step S600. The processes at Steps S600 and S700 according to the one embodiment are similar to those of the comparative example. The processes at Steps S600 and S700 according to the one embodiment are different from those of the comparative example in that the processes at Steps S600 and S700 according to the one embodiment process the horizontal raster lines only.

If the raster data Rd is determined to include the vertical raster lines, the raster image processor 122 advances the process to Step S320. At Step S320, the raster image processor 122 performs a constant color line detecting process.

Figure 6:
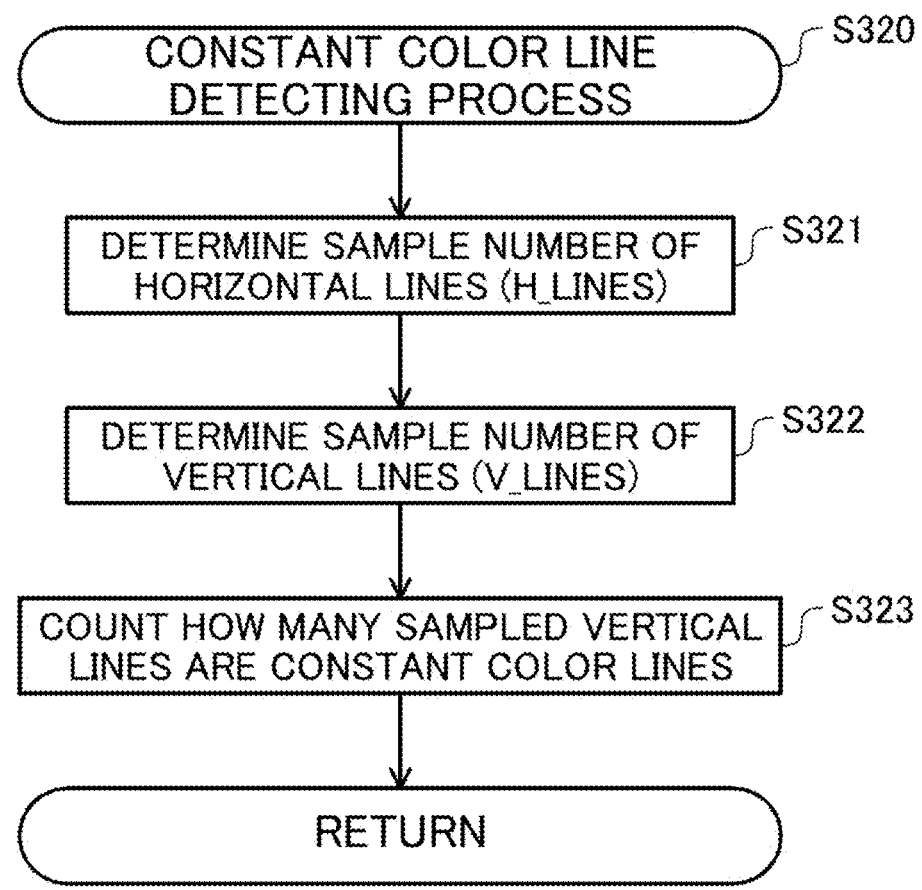
FIG. 6 illustrates a flow chart representing a constant color line detecting process according to the one embodiment.

FIG. 6 illustrates a flow chart representing the constant color line detecting process (S320) according to the one embodiment. At Step S321, the raster image processor 122 determines the sample number of horizontal lines (H_lines) based on, such as, its resolution specified in the PDL data. At Step S322, the raster image processor 122 determines the sample number of vertical lines (V_lines) based on, such as the specified resolution. Thus, the raster lines each have the limited number of pixels for reducing the calculation cost of a sampling processing.

Figure 7:
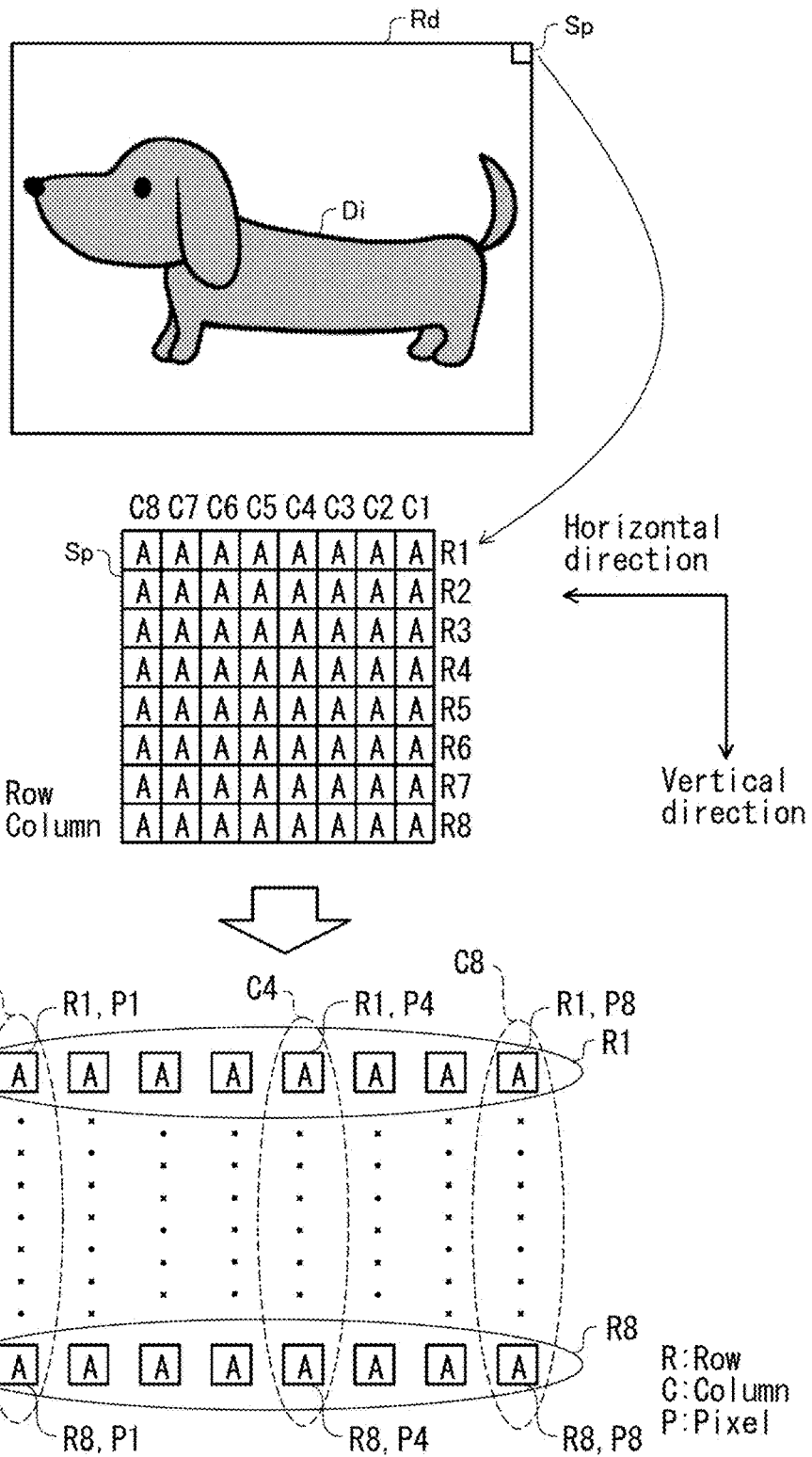
FIG. 7 schematically illustrates a sampling processing according to the one embodiment.

FIG. 7 schematically illustrates the sampling processing according to the one embodiment. In this case, a sampling portion Sp of the raster data Rd is processed by the raster format conversion processing. The raster image processor 122 extracts sampling pixel data of the sampling portion Sp, which is illustrated in an enlarged scale for showing all the pixels of the sampling portion Sp. The sampling pixel data consists of eight horizontal lines, which include rows of R1 to R8, and eight vertical lines, which include columns of C1 to C8.

For example, the row R1 has eight pixels with a pixel value of "A." These eight pixels consist of the pixels R1, P1 to R1, P8. The column C1 has eight pixels with a pixel value of "A." These eight pixels consist of the pixels R1, P1 to R8, P1.

Figure 8:
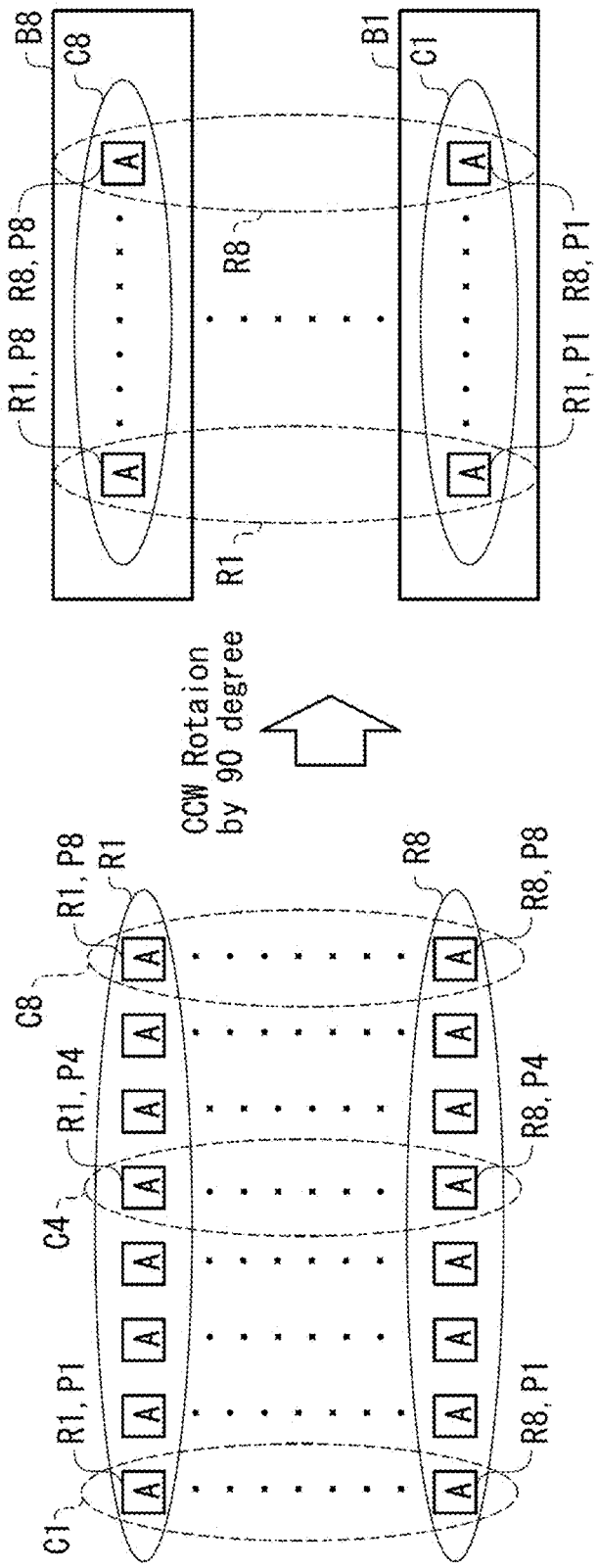
FIG. 8 illustrates the constant color line detecting process according to the one embodiment.

FIG. 8 illustrates the constant color line detecting process according to the one embodiment. The raster image processor 122 stores the columns of C1 to C8 into respective band buffers B1 to B8 in a memory (not shown) of the image forming unit 120. The raster image processor 122 then analyses every column of the columns of C1 to C8 in the respective band buffers B1 to B8 to detect constant color lines in the columns of C1 to C8.

At Step S323, the raster image processor 122 counts how many sampled vertical lines (the columns) are constant color lines in the sampling portion Sp. The raster image processor 122 divides the count of constant color lines by the count of all the color lines in the sampling portion Sp, which is eight in this case, to calculate a constant color line percentage.

At Step S330 (see FIG. 5), the raster image processor 122 compares the constant color line percentage with a predetermined threshold Th. If the constant color line percentage is determined to be greater than the threshold Th, the raster image processor 122 advances the process to Step S340. If the constant color line percentage is determined not to be greater than the threshold Th, the raster image processor 122 advances the process to Step S600. At Step S340, the raster image processor 122 performs a fast raster format conversion process.

Figure 9:
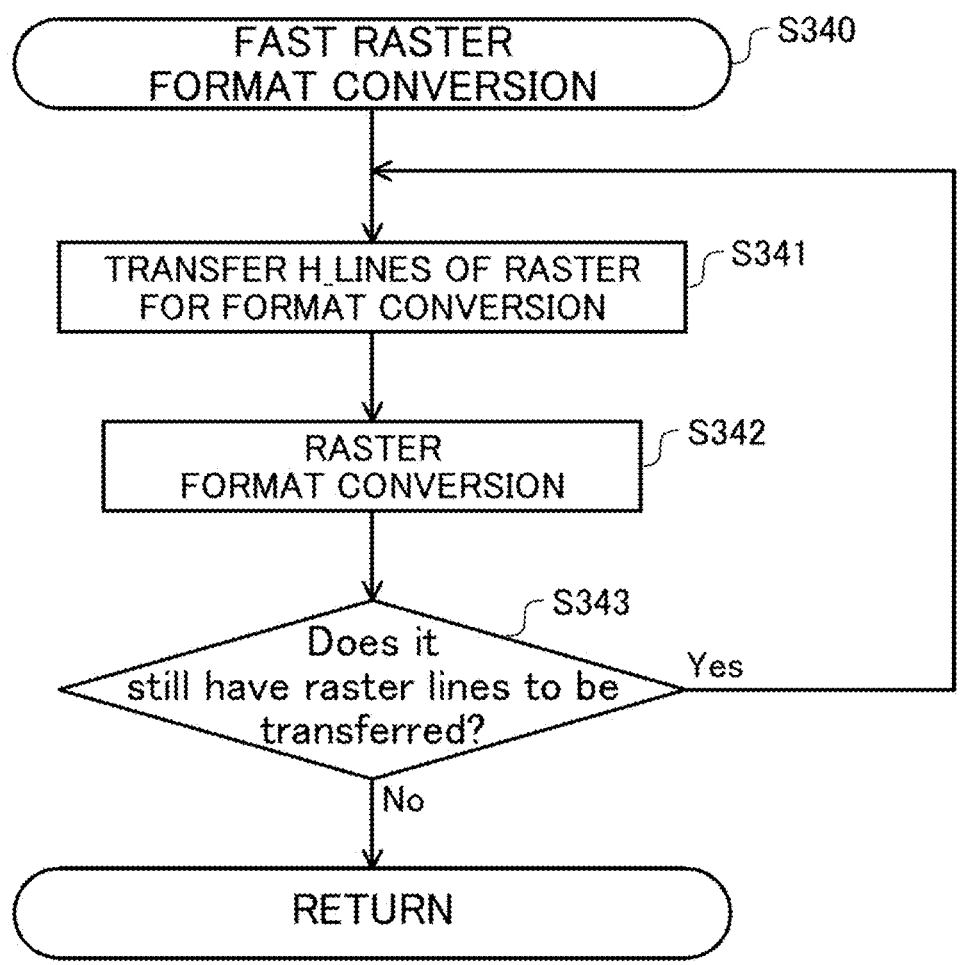
FIG. 9 illustrates a flow chart representing a fast raster format conversion process according to the one embodiment.

FIG. 9 illustrates a flow chart representing the fast raster format conversion process (S340) according to the one embodiment. At Step S341, the PDL processor 121 transfers the first eight horizontal lines R1 to R8 of the raster data Rd to the raster image processor 122.

In contrast to the sampling processing, the first eight horizontal lines R1 to R8 each have all the pixels in each of their raster lines of the raster data Rd. For example, the row R1 consists of the N pixels R1, P1 to R1, PN. The column C1s1 consists of the eight pixels R1, P1 to R8, P1.

At Step S342, the raster image processor 122 performs a raster format conversion process. Assume that the raster data Rd has the N columns of C1 to CN, which means that the raster lines of the raster data Rd each have the N number of pixels in each of their raster lines.

Figure 10:
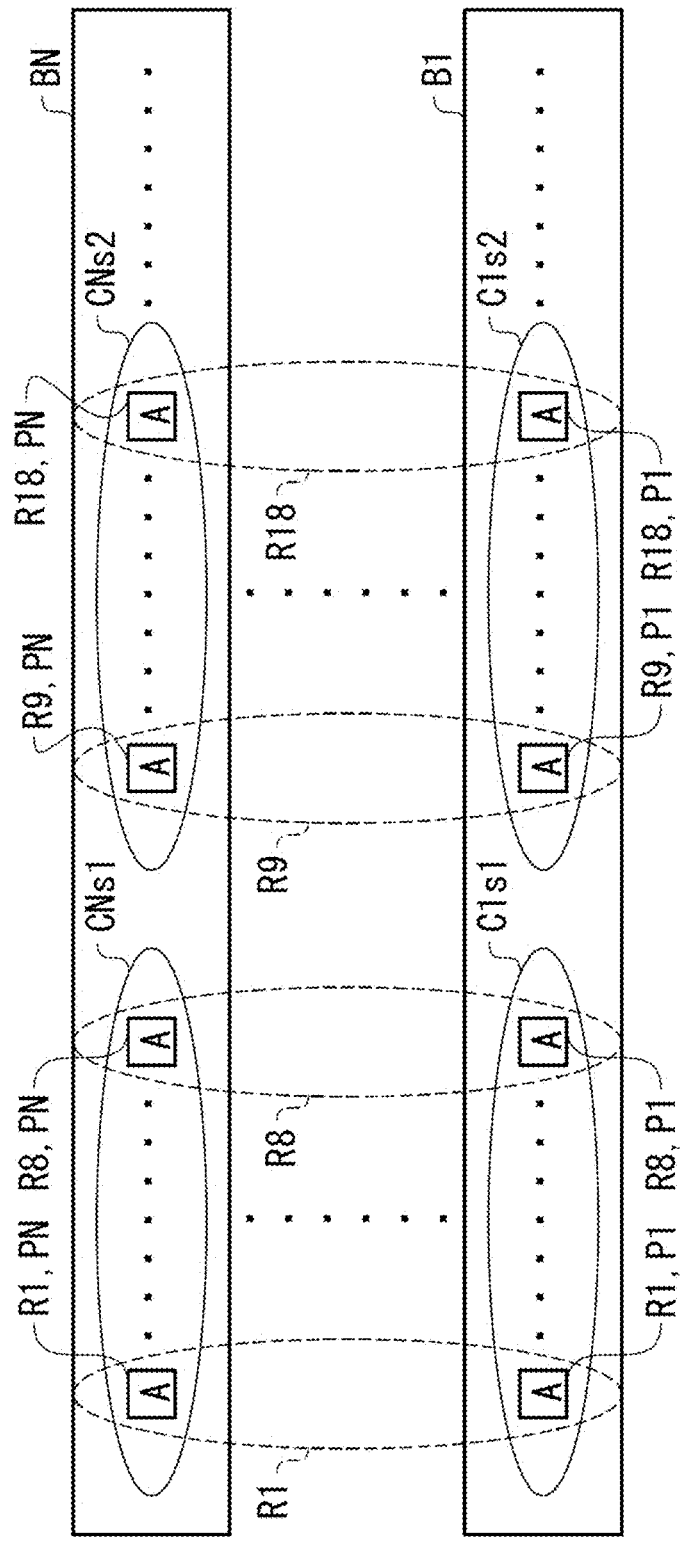
FIG. 10 schematically illustrates the fast raster format conversion according to the one embodiment.

FIG. 10 schematically illustrates the fast raster format conversion according to the one embodiment. The raster image processor 122 obtains one raster line in the vertical direction, which is one column pixels of the raster data Rd similarly to that of Step S720, as a column segment. The column segment is to be connected to later appended column segments so as to make one column. In other words, the raster image processor 122 obtains first raster line data as data of a first raster line including the plurality of pixels arranged in the first direction from raster data RD.

The raster image processor 122 stores column segments of C1s1 to CNs1 into respective band buffers B1 to BN in the memory (not shown) of the image forming unit 120. The column segments of C1s1 to CNs1 each have eight pixels of the first eight horizontal lines R1 to R8 of the raster data Rd. The column segments of C1s1 to CNs1 each include all the plurality of pixels of the first eight horizontal lines R1 to R8 of the raster data Rd arranged in the vertical direction.

The raster image processor 122 then analyses every column segments of C1s1 to CNs1 in the respective band buffers B1 to BN to detect constant color lines in the column segments of C1 to CN. The column segment is also referred to as "raster line segment."

This raster format conversion process is similar to that of S700 in the comparative example. The process at Step S700 according to the one embodiment is different from that of the comparative example in that the process at Step S700 according to the one embodiment processes the vertical raster lines only.

At Step S343, if the raster data Rd is determined to still have raster lines to be transferred, the raster image processor 122 returns the process to Step S341. At Step S341, the raster image processor 122 transfers the next (or the second in this case) eight horizontal lines R9 to R18 of the raster data Rd, and then the raster image processor 122 performs the raster format conversion process (Step S342).

The raster image processor 122 appends the column segments of C1s2 to CNs2 into the respective band buffers B1 to BN in the memory (not shown) of the image forming unit 120. The column segments of C1s2 to CNs2 each have eight pixels of the second eight horizontal lines R9 to R18 of the raster data Rd. The raster image processor 122 then analyses every column segments of C1s2 to CNs2 in the respective band buffers B1 to BN to detect constant color lines in the columns of C1 to CN.

Accordingly, the fast raster format conversion according to the one embodiment is different from the raster format conversion according to the comparative example in that the columns are segmented into the column segments each including the vertical eight pixels. These short-segmented columns (which are column segments) ensure the high chance to find a constant color line compared with the entire long columns in the raster data Rd. This leads to the high chance to employ the process at Step S750 for avoiding the time-consuming processes of the format conversion and the color conversion process.

If the raster data Rd is determined not to have raster lines left (Step S343), the raster image processor 122 advances the process to Step S800. At step S800 (see FIG. 5), the image output unit 123 prints or reproduces the original page image Pd similarly to that of the comparative example.

As described above, the image forming device 100 according to the one embodiment efficiently processes the raster data by employing the fast raster format conversion process.

Modifications

The disclosure will not be limited to the embodiment described above, but modifications as follows are also possible.

Modification 1

While in the above-described embodiment the raster format convertor obtains eight raster lines at a time from the raster data in the fast raster format conversion process, this number of raster lines is not limited to eight. The inventor has found a preferred count of at least 32, including 64, in some typical configurations. The raster line segment includes all the plurality of pixels arranged in the second direction in the obtained raster lines at a time.

Modification 2

While in the above-described embodiment and the modification the raster format convertor obtains the limited number of raster lines at a time from the raster data in the fast raster format conversion process, the raster format convertor may obtain the whole raster lines in the raster data. In this case, the raster format convertor selects the limited number of raster lines at a time, and the raster line segment includes the selected limited number of pixels arranged in the second direction.

In the above-described embodiment and the modification, the raster format convertor compares the constant color line percentage in the sampling portion with the threshold Th. The raster format convertor employs the fast raster format conversion process when the constant color line percentage is determined to be greater than the threshold Th. This should not be construed in a limiting sense. The fast raster format conversion process may be employed without the above-described limitation. This limitation ensures the efficient processing of the raster data by confirming that the raster data has the enough percentage of constant color lines for the fast raster format conversion process (S340) to pay off.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image processing method comprising:
   obtaining first raster line data as data of a first raster line including a plurality of pixels arranged in a first direction from raster data;
   generating raster line segment data as data of a raster line segment including a plurality of pixels arranged in a second direction perpendicular to the first direction from the received N number (N being an integer equal to or greater than 2) of the first raster lines;
   determining whether the plurality of pixels have an identical pixel value, the plurality of pixels constituting the raster line segment;
   encoding the raster line segment where the plurality of pixels have the identical pixel value;
   storing second raster line data as data of the second raster line including a plurality of pixels arranged in the second direction, the second raster line being produced by connecting the plurality of raster line segments; and
   rendering the second raster lines while decoding the encoded raster line segment.

2. The method of claim 1, wherein:
   the obtaining includes obtaining the N number of the first raster lines at a time; and
   the generating includes generating the raster line segment data as a raster line including all the plurality of pixels arranged in the second direction of the obtained N number of the first raster lines.

3. The method of claim 2, further comprising:
   a sampling process of obtaining the first raster lines from a sampling portion, the sampling portion consisting of the N number of the first raster lines having the limited number of pixels.

4. The method of claim 1, wherein the storing includes appending the raster line segments in a line buffer to connect the raster line segments for producing the second raster line.

5. The method of claim 1, further comprising:
   receiving a print job described in page description language; and
   analyzing the received print job to extract the raster data and page orientation data indicating a page orientation with which the raster data is aligned; wherein
   the rendering includes aligning the raster data with the page orientation based on the page orientation data by using the second raster line data as the first raster line data.

6. The method of claim 1, wherein N is at least 32.

7. An image forming device, including one or more processors, and a non-transitory data storage storing computer-readable instructions that, when executed by the one or more processors, cause the image forming device to perform functions comprising:
   obtaining first raster line data as data of a first raster line including a plurality of pixels arranged in a first direction from raster data;
   generating raster line segment data as data of a raster line segment including a plurality of pixels arranged in a second direction perpendicular to the first direction from the received N number (N being an integer equal to or greater than 2) of the first raster lines;
   determining whether the plurality of pixels have an identical pixel value, the plurality of pixels constituting the raster line segment;
   encoding the raster line segment where the plurality of pixels have the identical pixel value;
   storing second raster line data as data of the second raster line including a plurality of pixels arranged in the second direction, the second raster line being produced by connecting the plurality of raster line segments; and
   rendering the second raster lines while decoding the encoded raster line segment.

8. The image forming device of claim 7, wherein:
   the obtaining includes obtaining the N number of the first raster lines at a time; and
   the generating includes generating the raster line segment data as a raster line including all the plurality of pixels arranged in the second direction of the obtained N number of the first raster lines.

9. The image forming device of claim 8, wherein the non-transitory data storage further causes the image forming device to perform a sampling process of obtaining the first raster lines from a sampling portion, the sampling portion consisting of the N number of the first raster lines having the limited number of pixels.

10. The image forming device of claim 7, wherein the storing includes appending the raster line segments in a line buffer to connect the raster line segments for producing the second raster line.

11. The image forming device of claim 7, wherein:
the non-transitory data storage further causes the image forming device to perform
receiving a print job described in page description language, and
analyzing the received print job to extract the raster data and page orientation data indicating a page orientation with which the raster data is aligned; and
the rendering includes aligning the raster data with the page orientation based on the page orientation data by using the second raster line data as the first raster line data.

12. The image forming device of claim 7, wherein N is at least 32.

13. A non-transitory computer-readable recording medium storing computer-readable instructions that, when executed by the one or more processors, cause an image forming device to execute:
obtaining first raster line data as data of a first raster line including a plurality of pixels arranged in a first direction from raster data;
generating raster line segment data as data of a raster line segment including a plurality of pixels arranged in a second direction perpendicular to the first direction from the received N number (N being an integer equal to or greater than 2) of the first raster lines;
determining whether the plurality of pixels have an identical pixel value, the plurality of pixels constituting the raster line segment;
encoding the raster line segment where the plurality of pixels have the identical pixel value;
storing second raster line data as data of the second raster line including a plurality of pixels arranged in the second direction, the second raster line being produced by connecting the plurality of raster line segments; and
rendering the second raster lines while decoding the encoded raster line segment.

14. The computer-readable recording medium of claim 13, wherein:
the obtaining includes obtaining the N number of the first raster lines at a time; and
the generating includes generating the raster line segment data as a raster line including all the plurality of pixels arranged in the second direction of the obtained N number of the first raster lines.

15. The computer-readable recording medium of claim 14, further causing the image forming device to execute a sampling process of obtaining the first raster lines from a sampling portion, the sampling portion consisting of the N number of the first raster lines having the limited number of pixels.

16. The computer-readable recording medium of claim 13, wherein the storing includes appending the raster line segments in a line buffer to connect the raster line segments for producing the second raster line.

17. The computer-readable recording medium of claim 13, further causing the image forming device to execute:
receiving a print job described in page description language, and
analyzing the received print job to extract the raster data and page orientation data indicating a page orientation with which the raster data is aligned; wherein
the rendering includes aligning the raster data with the page orientation based on the page orientation data by using the second raster line data as the first raster line data.

18. The computer-readable recording medium of claim 13, wherein N is at least 32.

* * * * *